(12) United States Patent
Vollmar et al.

(10) Patent No.: US 7,851,942 B2
(45) Date of Patent: Dec. 14, 2010

(54) CIRCUIT ARRANGEMENT FOR SUPPLYING VARIABLE LOADS FROM THREE PHASES

(75) Inventors: Wilfried Vollmar, Soest (DE); Michael Harro Liese, Soest (DE)

(73) Assignee: AEG Power Solution B.V., Zwanenburg (NL)

( * ) Notice: Subject to any disclaimer, the term of this patent is extended or adjusted under 35 U.S.C. 154(b) by 281 days.

(21) Appl. No.: 12/015,927

(22) Filed: Jan. 17, 2008

(65) Prior Publication Data

US 2008/0179952 A1 Jul. 31, 2008

(30) Foreign Application Priority Data

Jan. 18, 2007 (DE) .................... 20 2007 001 083
Aug. 8, 2007 (EP) ................... 07015591

(51) Int. Cl.
*H02M 5/25* (2006.01)
*H02J 3/00* (2006.01)

(52) U.S. Cl. .................. 307/31; 307/34; 307/36; 307/37

(58) Field of Classification Search .............. 307/17, 307/20, 24, 29, 31, 34, 36, 37
See application file for complete search history.

(56) References Cited

U.S. PATENT DOCUMENTS 3,796,890 A * 3/1974 Thompson et al. ............ 307/31
4,562,338 A 12/1985 Okami
2008/0179952 A1 * 7/2008 Vollmar et al. ............... 307/31

FOREIGN PATENT DOCUMENTS

| CN | 2927284 | * | 7/2007 |
| DE | 203 18 061 U1 | | 3/2004 |
| DE | 20 2004 004 665 U1 | | 7/2004 |
| DE | 20 2004 014 812 U1 | | 12/2004 |

* cited by examiner

*Primary Examiner*—Fritz M Fleming
(74) *Attorney, Agent, or Firm*—Norris McLaughlin & Marcus, PA; Christa Hildebrand, Esq.

(57) ABSTRACT

Disclosed is a circuit arrangement for supplying variable loads (I1, I2, M1, M2, O1, O2, O3) from three phases (L1, L2, L3), with a circuit arrangement having four groups of terminals (A11, A12, A13, A14; A21, A22, A23, A24; A31, A32; A41, A42, A43) for the loads (I1, I2, M1, M2, O1, O2, O3) which are subsequently designated as terminal groups; the circuit arrangement is suitable and set up for supplying the terminals (A21, A22, A23, A24) of the second terminal group from the first phase (L1); the circuit arrangement is suitable and set up for supplying the terminals (A41, A42, A43) of the fourth terminal group from a second phase (L2); the circuit arrangement is suitable and set up for supplying the terminals (A11, A12, A13) of the first terminal group and the third terminal group (A31, A32) from a third phase (L3); the circuit arrangement is suitable and set up for controlling the voltage of the four terminal groups, and exhibits three control loops for this purpose.

15 Claims, 2 Drawing Sheets

CIRCUIT ARRANGEMENT FOR SUPPLYING VARIABLE LOADS FROM THREE PHASES

FIELD OF THE INVENTION

The invention relates to a circuit arrangement for supplying loads, particularly variable loads, from three phases of an electrical power supply system.

BACKGROUND OF THE INVENTION

From the utility model documents having publication numbers DE 2004 014 812 U1, DE 20 2004 004 655 U1 and DE 20318 061 U1, circuit arrangements are known by means of which loads can be supplied from one phase of an electrical power supply system. The loads can be loads which vary in operation. The circuit arrangements described in the said utility model documents are provided, in particular, for silicon deposition installations for growing silicon crystals. The loads are here formed by the crystals to be grown. During the operation, the crystals grow and, as a result, change their electrical resistance.

For a particular installation, it is intended to be able to grow distinctly more crystals simultaneously in one reactor. This requires higher powers which is why a three-phase supply with electrical energy is appropriate.

It is a special feature of the reactor that the loads which are formed by the silicon crystals produced are arranged in three concentric circles. Each of these concentric circles comprises a group of silicon crystals, i.e. a group of loads. The number of loads of the load group forming the outer ring is larger than the number of loads of the inner ring.

The voltage curve or current curve traversed during the growing of the silicon crystals should be equal for the loads of a group of loads. Between the groups of loads, however, there can be differences in the current or voltage curves to be maintained. It is appropriate, therefore, to control the current or voltage variation during the growing of the silicon crystals of each load group with a separate control loop.

In contrast, it is also appropriate if an identical number of loads are connected to the three phases of the electrical power supply system. The expert is thus confronted with the requirement of proposing a circuit arrangement which, on the one hand, provides for controlling the three load groups of different size and, on the other hand, ensures a uniform distribution of the loads of the three phases of the power supply system.

SUMMARY OF THE INVENTION

These requirements are met by a circuit arrangement according to the invention, having the features of claim 1.

Accordingly, the circuit arrangement according to the invention has four groups of terminals for the loads which are subsequently designated as terminal groups. The circuit arrangement is suitable and set up for supplying the terminals of the second terminal group from the first phase. The circuit arrangement is also suitable and set up for supplying the terminal of the fourth terminal group from a second phase. In addition, the circuit arrangement is suitable and set up for supplying the terminals of the first terminal group and the third terminal group from a third phase.

Furthermore, a circuit arrangement according to the invention is suitable and set up for controlling the voltage of the four terminal groups, wherein the first terminal group is allocated to a first control loop, the second terminal group is allocated to a second control loop and the third and fourth terminal group are allocated to a common third control loop.

The first control loop comprises a first controller and a first group of controllable switching means for adjusting the voltage as actuators of the first control loop, this first group of controllable switching means being designated as first group of switching means.

The second control loop comprises a second controller and a second group of controllable switching means which is provided for adjusting the voltage as actuators of the second control loop. The second group of controllable switching means will be called second group of switching means in the text which follows.

The third control loop, finally, comprises a third controller and a third group of controllable switching means for adjusting the voltage as actuators of the third control loop, which is designated as third group of switching means in the text which follows.

According to the invention, the controllable switching means can be thyristors. Naturally, it is conceivable that other suitable switching means by means of which a voltage can be adjusted are also used.

According to the invention, the first group of switching means can be suitable and set up for alternating between a parallel supply and a series supply of the loads which can be connected to the first terminal group. The second group of switching means can also be suitable and set up for alternating between a parallel supply and a series supply of the loads which can be connected to the second terminal group. Finally, the third group of switching means can also be suitable and set up for alternating between a parallel supply and a series supply of the loads which can be connected to the third and/or the fourth terminal group.

The alternation between a parallel supply and a series supply of the loads which can be connected to the terminal groups is of advantage for growing silicon crystals since in a first phase, it is a high voltage across the loads, and in a second phase it is a high current through the loads, which are advantageous for the growth of the variable loads or silicon crystals, respectively.

In a circuit arrangement according to the invention, the switching means of the first group of switching means can be suitable and set up for switching currents from the third phase. The switching means of the second group of switching means can be suitable and set up for switching currents from the first phase. A first subgroup of switching means of the third group of switching means can be suitable and set up for switching currents from the second phase and a second subgroup of switching means of the third group of switching means can be suitable and set up for switching currents from the third phase.

A circuit arrangement according to the invention can be arranged in such a manner that the lowest voltage which can be set by the switching means of the first group of switching means or the second subgroup of the third group of switching means is half as large as the voltage which can be set by the switching means of the second group and the first subgroup of the third group of switching means.

If variable loads are connected to a circuit arrangement according to the invention, an arrangement according to the invention can be obtained in which a first group of loads is connected to the terminals of the first terminal group, a second group of loads is connected to the terminals of the second terminal group and a third group of loads is connected to the terminals of the third terminal group and the terminals of the fourth terminal group.

The resistance of the loads connected to the second and the fourth terminal group is advantageously equally large. Similarly, the resistance of the loads connected to the first and the third terminal group is advantageously equally large. The total resistance of the loads connected to the first and the third terminal group can here be advantageously of equal magnitude to the resistance of the loads connected to the second or the fourth terminal group.

BRIEF DESCRIPTION OF THE DRAWINGS

Two illustrative embodiments according to the invention for circuit arrangements for supplying variable loads from three phases and two arrangements of such circuit arrangements and loads connected thereto are described in greater detail with reference to the drawings, in which.

DETAILED DESCRIPTION OF CERTAIN EXEMPLARY EMBODIMENTS

Figure 1:
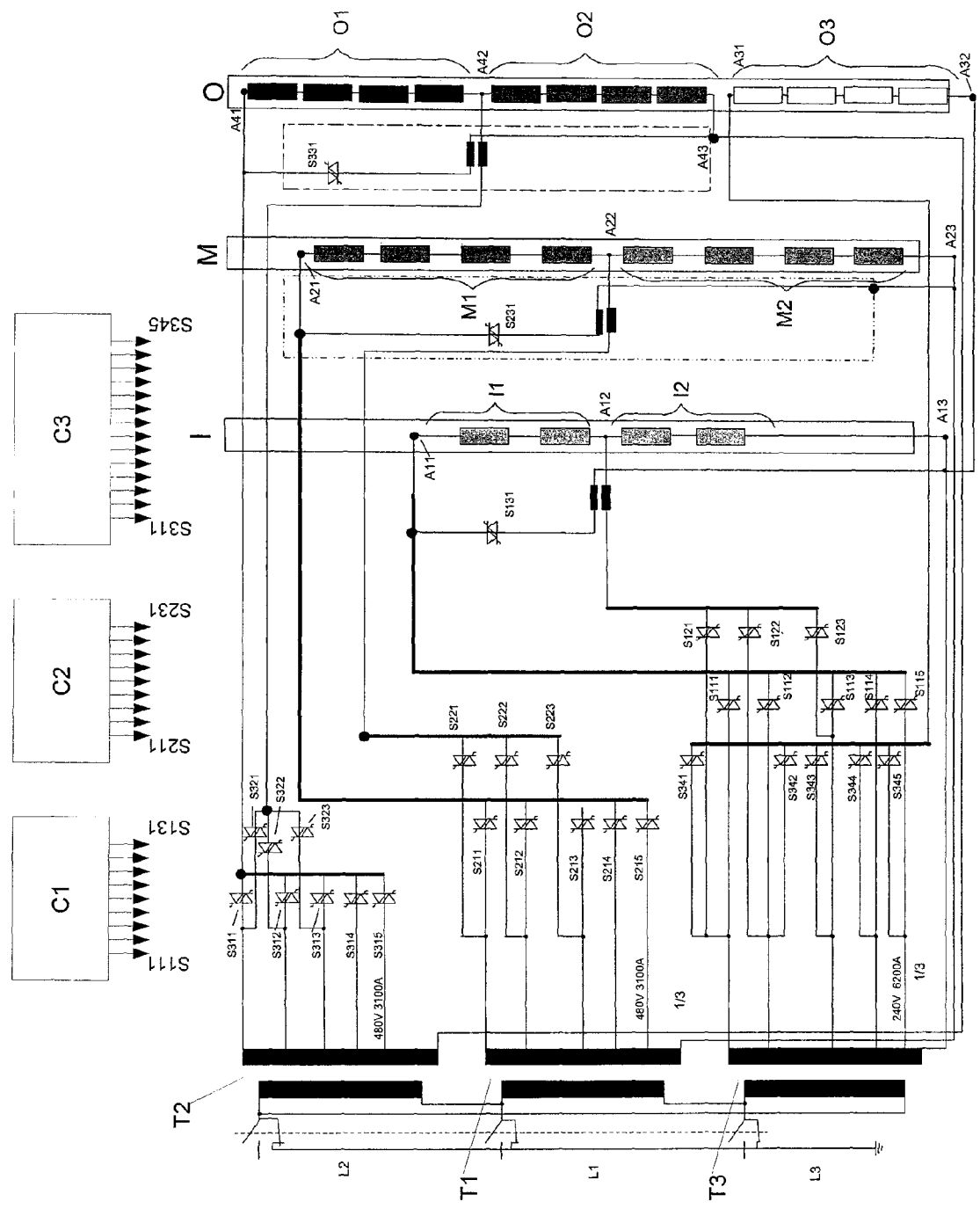
FIG. 1 shows a first illustrative embodiment of a circuit arrangement and an arrangement of such a circuit arrangement and loads connected thereto.

The circuit arrangement according to FIG. 1 has three transformers T1, T2, T3 which are connected with their primary side to a three-phase voltage supply system having a first phase L1, a second phase L2 and a third phase L3. The secondary side of the transformers T1, T2, T3 in each case has a number of tabs so that different voltages can be picked off on the secondary side of the transformers. Whereas the highest voltage to be picked off is of equal magnitude in all three transformers T1, T2, T3, the lowest voltage which can be picked off on the secondary side is twice as large at the first transformer T1 and at the second transformer T2 as at the third transformer T3.

The secondary side of the transformers T1, T2, T3 is connected to various switching means S111 to S345 via which three groups I, M, O of loads I1, I2; M1, M2; O1, O2, O3 are connected. The loads are supplied uniformly with electrical power from the three phases L1, L2, L3 of the voltage supply. The loads I1 to O3 are distributed to the three phases L1, L2, L3 in such a manner that they are uniformly loaded. On the other hand, it is required that the loads I1 to O3 are controlled group by group. This leads to the circuit arrangement according to the invention.

In the circuit arrangement according to the invention, the loads I1, I2 of the first group of loads I, which are connected to the circuit arrangement via terminals A11, A12, A13 of a first terminal group, are supplied from the third phase L3. In contrast, the loads M1, M2 of the second group of loads M which are connected to the circuit arrangement via the terminals A21, A22, A23 of a second terminal group are supplied with electrical power from the first phase L1.

The total resistance of the loads M1, M2 of the second group is approximately twice as large here as the total resistance of the loads I1, I2 of the first group I.

The loads O1, O2, O3 of the third group of loads O are partially supplied from the second phase L2 and partially from the third phase L3. Whilst a subgroup O3 of the group of loads O is supplied from the third phase L3 and is connected to the circuit arrangement via a terminal A31, A32 of a third terminal group, a subgroup O1, O2 of the third group of loads O is supplied with electrical power from the second phase L2 and is connected to the circuit arrangement via terminals A41, A42, A43 of a fourth terminal group for this purpose.

Thus, the terminals A11, A12, A13 of the first terminal group are connected to the third phase L3, the terminals A21, A22, A23 of the second terminal group are connected to the first phase L1, the terminals A31, A32 of the third terminal group are connected to the third phase L3 and the terminals A41, A42, A43 of the fourth terminal group are connected to the second phase L2 with interposition of the switching means S111 to S345.

The switching means S111 to S345 are controlled switching means, namely thyristors which are control elements of a total of three control loops by means of which the voltage or the power, respectively, of the three groups of loads I, M, O can be controlled. The controllers C1, C2, C3 provided for driving the control elements or the controlled switching means S111 to S345, respectively, are not shown in FIG. 1. As well, sensors needed for completing the three control loops are not designated in FIG. 1.

The controlled switching means S111 to S345 are arranged in three groups, a first group of switching means S111 to S131 being allocated to the first group of loads I. A second group of switching means S211 to S231 is allocated to the second group of loads M. The third remaining group of switching means S311 to S345 is allocated to the third group of loads O. The groups of switching means can be used for adjusting the voltage, and thus the power, of the loads of their in each case associated group of loads I, N, O.

The first group of switching means enables the two loads I1, I2 of the first group of loads I, connected in parallel or in series, to be supplied with electrical power. If the electrical loads are to be supplied with electrical power connected in parallel, one of the switching means S121, S122 or S123 is switched through so that current can flow from one of the taps of the secondary side of the third transformer T3 through the switching means S121, S122, S123 into the connection A12 of the circuit arrangement. The current flowing into the terminal A12 branches and is uniformly distributed to the two loads I1, I2. Whilst the current flows off directly to the reference potential of the third transformer T3 on its secondary side via the load I2 and the terminal A13, the current flows off to the reference potential of the third transformer T3 through the load I1, via the terminal A11 and via a switched-through switching means S131. The remaining switching means S111, S112, S113, S114, S115 are cut off in parallel operation of the loads I1, I2.

Selecting the switching means S121, S122, S123 as current-conducting switching means makes it possible to adjust the voltage at terminal A12 due to the connection of the switching means to different taps. Each of the switching means here covers a voltage range which, on the one hand, is predetermined by the choice of a phase angle, i.e. by the choice of the switch-on time of the switching means during a period or, respectively, the firing time of the thyristor and, on the other hand, by the voltage at the tap.

If the loads I1, I2 of the first group of loads I are to be supplied with electrical power and connected in series, the first group of loads I is connected to one of the taps of the coil on the secondary side of the third transformer T3 via the terminal A11 and one of thyristors S111, S112, S113, S114 or S115. The remaining switching means S121, S122, S123 and the switching means S131 are cut off in series operation of the first group of loads I. The current flows via one of the current-conducting thyristors S11 to S115, the terminal A11 through the load I1 through the load I2 and via the terminal A13 to the reference point of the secondary side of the third transformer T3. Depending on what voltage is to be set at the terminal A11, one or the other switching means S111 to S115 conducts current. With each switching means, a particular voltage range predetermined by the tap and the possible phase angles can be covered.

The loads M1, M2 of the second group of loads M are supplied analogously to the supply of the first group of loads I. Loads M1, M2 of the second group of loads M can also be supplied with electrical power both in parallel operation and in series operation. In the case of parallel operation, supply is provided via terminal A22. In the case of purely series operation, it is provided via terminal A21.

Terminal A22 is connected via a current rail to switching means S221, S222, S223 which, in turn, are in each case connected to a tap on the secondary side of the first transformer T1. One of the switching means S221, S222, S223 is in each case current conducting and the voltage at terminal A22 can be predetermined depending on the selection of the switching means and depending on the setting of the phase angle. The current then flows from terminal A22 both into load M1 and into load M2. The current flowing through load M2 is conducted via terminal A23 directly to the reference potential on the secondary side of the first transformer T1 whilst the current through load M1 is conducted via terminal A21 and via the switching means 231, which conducts current in parallel operation of the loads M1, M2, to the reference potential on the secondary side of transformer T1.

In series operation of the loads M1, M2, one of the controlled switching means S211, S212, S213, S214, S215 conducts current in order to enable the current from one of the taps on the secondary side of the first transformer T1 to terminal A21. From terminal A21, the current flows through load M1, through load M2 and via terminal A23 to the reference potential on the secondary side of the first transformer T1. The switching means S221, S222, S223 and switching means S231 are cut off in series operation.

Similarly analogously, the loads O1 and O2 of the group of loads O are supplied with electrical power. In parallel operation of the loads O1, O2, one of the switching means S321, S322, S323 and the switching means S331 are switched through in order to enable a current to flow from one of the taps on the secondary side of the second transformer T2 via the terminal A42, from there, on the one hand, through load O1 via terminal A41 and the switched-through switching means S331 and, on the other hand, through load O2 via terminal A23 to the reference potential on the secondary side of the second transformer T2.

In series operation, in contrast, the subgroup formed from the loads O1, O2 of the third group of loads O is supplied with voltage from one of the taps on the secondary side of the second transformer T2 via one of the switching means S311, S312, S313, S314 or S315. In series operation of the subgroup formed from the loads O1, O2 of the third group of loads O, the switching means S321, S322, S323 and the switching means S331 are cut off.

Load O3 of the third group of loads O is supplied with electrical power via the third transformer T3 from the third phase L3. To supply load O3, one of the switching means S341, S342, S343, S344 or S345 conducts current. Depending on the choice of switching means which is in each case connected to a tap on the secondary side of the transformer T3, the voltage at terminal A31 via which load O3 is connected can be supplied with electrical power. The voltage is predetermined by the choice of switching means and by the choice of phase angle which is set by a controller, not shown.

To each group of switching means of the circuit arrangement, a controller C1, C2 or C3 is allocated which predetermines the phase angles of the individual switching means S111 to S345. Whilst switching means S111 to 131 of the first group of switching means and switching means S211 to 231 of the second group of switching means are in each case only supplied with voltage from a phase L3 and L1 respectively, switching means S311 to 345 of the third group of switching means are supplied with voltage from two phases, namely from the second phase L2 and the third phase L3, for supplying the third group of loads O. Nevertheless, switching means S311 to S345 of the third group of switching means are driven by a controller and, together with this controller and associated sensors, belong to a third control loop.

Figure 2:
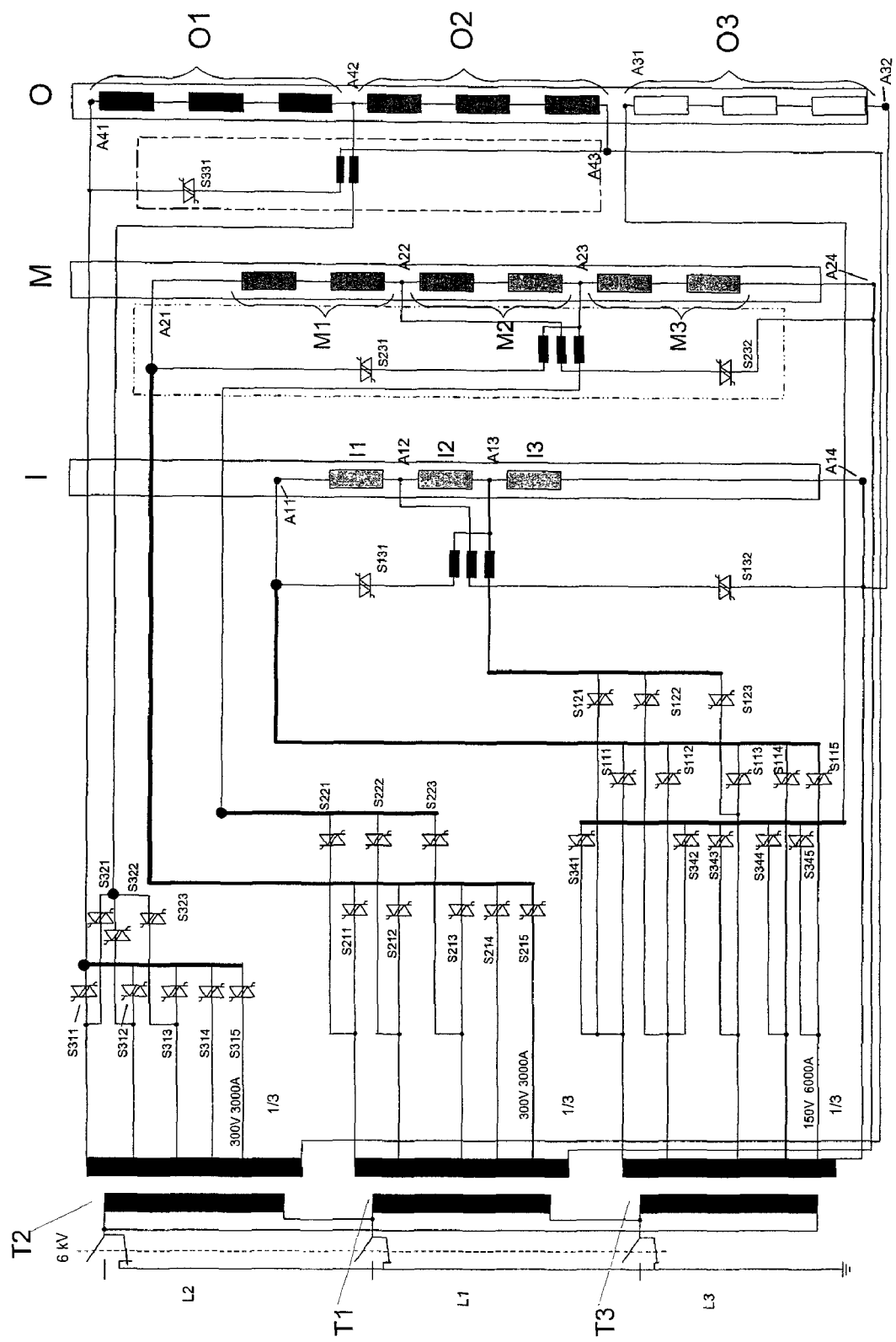
FIG. 2 shows a second illustrative embodiment of a circuit arrangement and an arrangement of such a circuit arrangement and loads connected thereto.

The second illustrative embodiment of a circuit arrangement according to the invention, shown in FIG. 2, and an arrangement of the circuit arrangement according to the invention and loads connected thereto exhibit many commonalities with the first illustrative embodiment. Identical or identically acting constructional elements, components and connections are therefore provided with identical designations. In the text which follows, the differences between the two illustrative embodiments will be essentially discussed.

The essential difference between the two circuit arrangements according to the invention is that the circuit arrangement according to FIG. 2 is provided for connecting in each case three loads to the first terminal group and the second terminal group. The first group I therefore comprises three loads I1, I2, I3 and the second group of loads M comprises three loads M1, M2 and M3. Both the three loads of the first group of loads I and the three loads M1, M2, M3 of the second group of loads M can be supplied with electrical power from the third phase L3 and from the first phase L1, respectively, whilst connected in parallel and in series.

To provide for a parallel supply to the three loads of the first group of loads I and the second group of loads M requires in each case a further terminal A14 and A24, respectively, in the first terminal group and in the second terminal group, a further switching means S132 and S232, respectively, in each case in the first group of switching means and the second group of switching means and an altered line routing. The manner of line routing or of using the additional switching means, respectively, is basically known from the document having publication number DE 203 18 061 U1, to which reference is made.

In the case of parallel operation, both the switching means S131, S231 and switching means S132 and S232, respectively, are switched through. The current then flows through one of the switched-through switches S131, S122, S123 and S221, S222, S223, respectively, on the one hand, to terminal A13 and A23, respectively, between load I2 and load I3 and load M2 and load M3, respectively, and via switching means S131 and S231, respectively, and terminal A11 and A21, respectively, to load I1 and to load M1, respectively. After the currents have flowed through loads I1, I2 and M1, M2, respectively, they flow from terminal A12 via the switching means S132 to the secondary reference potential of the third transformer T3 and, respectively, from terminal A22 via switching means S232 to the secondary reference potential of transformer T1. Similarly, the currents flow from loads I3 and M3, respectively, via terminals A14 and A24, respectively, to the secondary reference potential of transformers T3 and T1, respectively.

What is claimed is:

1. A circuit arrangement for supplying variable loads (I1, I2, M1, M2, O1, O2, O3) from three phases (L1, L2, L3), comprising
   a circuit arrangement including four groups of terminals (A11, A12, A13, A14; A21, A22, A23, A24; A31, A32; A41, A42, A43) for loads (I1, I2, M1, M2, O1, O2, O3), the loads are subsequently designated as terminal groups;

the circuit arrangement is capable of supplying the terminals (A21, A22, A23, A24) of the second terminal group from the first phase (L1);

the circuit arrangement is capable of supplying the terminals (A41, A42, A43) of the fourth terminal group from a second phase (L2);

the circuit arrangement is capable of supplying the terminals (A11, A12, A13) of the first terminal group and the third terminal group (A31, A32) from a third phase (L3);

the circuit arrangement capable of controlling the voltage of the four terminal groups, wherein a first control loop is allocated to the first terminal group and the first control loop comprises a first controller and a first group of controllable switches (S111 to S132) for setting the voltage as actuators, which is subsequently designated as first group of switches, a second control loop is allocated to the second terminal group and the second control loop comprises a second controller and a second group of controllable switches (S211 to S231) for setting the voltage as actuators which is subsequently designated as second group of switches, a common third control loop is allocated to the third terminal group and the fourth terminal group and the third control loop comprises a third controller and a third group of controllable switches (S311 to S345) for setting the voltage as actuators, which is subsequently designated as third group of switches.

2. The circuit arrangement according to claim 1, wherein the controllable switches (S111 to S345) are thyristors.

3. The circuit arrangement according to claim 2, wherein the first group of switches (S111 to 132) is capable of alternating between a parallel supply and a series supply of the loads (I1, I2) which can be connected to the first terminal group.

4. The circuit arrangement according to claim 2, wherein the second group of switches (S211 to S232) is suitable and set up for alternating between a parallel supply and a series supply of the loads (M1, M2) which can be connected to the second terminal group.

5. The circuit arrangement according to claim 2 wherein the third group of switches (S311 to S345) is suitable and set up for alternating between a parallel supply and a series supply of the loads (O1, O2, O3) which can be connected to the third and the fourth terminal group.

6. The circuit arrangement according to claim 2, wherein the switches of the first group of switches are suitable and set up for switching currents from the third phase (L3).

7. The circuit arrangement according to claim 2, wherein the switches of the second group of switches are suitable and set up for switching currents from the first phase (L1).

8. The circuit arrangement according to claim 2, wherein a first subgroup of switches (S311 to S331) of the third group of switches is suitable and set up for switching currents from the second phase (L2).

9. The circuit arrangement according to claim 2, wherein a second subgroup of switches (S341 to S345) of the third group of switches is suitable and set up for switching currents from the third phase (L3).

10. The circuit arrangement according to claim 9, wherein the lowest voltage, which can be set by the switches of the first group of switches (S111 to S132) or the second subgroup (S341 to S345) of the third group of switches is half as large as the voltage which can be set by the switches of the second group (S211 to S232) and the first subgroup (S311 to S331) of the third group of switches.

11. An arrangement of a circuit arrangement according to claim 1 and variable loads (I1, I2, M1, M2, O1, O2, O3), wherein a first group (I1, I2) of the loads (I1, I2, M1, M2, O1, O2, O3) is connected to the terminals (A11, Al2, A13, A14) of the first terminal group, a second group (M1, M2) of the loads (I1, I2, M1, M2, O1, O2, O3) is connected to the terminals (A21, A22, A23, A24) of the second terminal group, and a third group (O1, O2, O3) of the loads (I1, I2, M1, M2, O1, O2, O3) is connected to the terminals (A31, A32) of the third terminal group and the terminals (A41, A42, A43) of the fourth terminal group.

12. The arrangement according to claim 11, wherein the resistance of the loads (M1, M2; O1, O2) connected to the second and the fourth terminal group is equally large.

13. The arrangement according to claim 12, wherein the resistance of the loads (I1, I2; O3) connected to the first and the third terminal group is equally large.

14. The arrangement according to claim 12, wherein the total resistance of the loads (I1, I2; O3) connected to the first and the third terminal group is equal to the resistance of the loads (M1, M2; O1, O2) connected to the second or the fourth terminal group.

15. The arrangement according to claim 13, wherein the total resistance of the loads (I1, I2; O3) connected to the first and the third terminal group is equal to the resistance of the loads (M1, M2; O1, O2) connected to the second or the fourth terminal group.

* * * * *